United States Patent [19]

Cerf et al.

[11] 4,181,314
[45] Jan. 1, 1980

[54] SELF DRAINING SEAL

[76] Inventors: Donald B. Cerf; Perry J. Dreibus, both of 5435 Corning Ave., Los Angeles, Calif. 90056

[21] Appl. No.: 945,913

[22] Filed: Sep. 26, 1978

[51] Int. Cl.$^2$ .................... B60N 1/06; B60N 1/10; F16J 15/10
[52] U.S. Cl. .................... 277/205; 296/66; 296/93; 296/99 A
[58] Field of Search ............ 277/206 R, 205; 296/63, 296/66, 93, 99 A

[56] References Cited

U.S. PATENT DOCUMENTS

| | | | |
|---|---|---|---|
| 1,562,661 | 11/1925 | Simpson | 296/93 |
| 2,937,065 | 5/1960 | Harza | 277/205 X |
| 3,413,031 | 11/1968 | Gafvert et al. | 296/63 |
| 4,103,961 | 8/1978 | Cerf et al. | 296/63 |
| 4,139,232 | 2/1979 | Cerf et al. | 296/66 |

Primary Examiner—Robert S. Ward, Jr.
Attorney, Agent, or Firm—Donald D. Mon

[57] ABSTRACT

An abutment type peripheral seal for sealing the gap between a pivoted member and the boundary of an aperture in a structure, for example between a rumble seat lid and the peripheral boundary of a trunk lid in which it is located. The member is pivotal between a tilted position where it passes through the aperture and projects beyond both sides of the structure and a closed position where it lies in general alignment with the boundary and substantially closes the aperture. The member has an under face along the first part of its periphery and an upper face along a second part of its periphery. The seal is attached to the boundary and has an upwardly facing portion and a downwardly facing portion respectively facing and making a fluid sealing contact with the upper face and under face respectively when the member is in its closed position. The contact made by the upwardly-facing portion serves to retain above its abutment the water which enters the gap between the member and the periphery, and the seal in its downwardly facing portion includes channel means open to said gap and an exit conduit connected to the channel means both for the purpose of draining the channel means.

8 Claims, 9 Drawing Figures

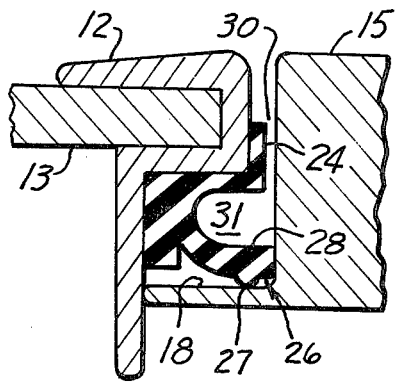
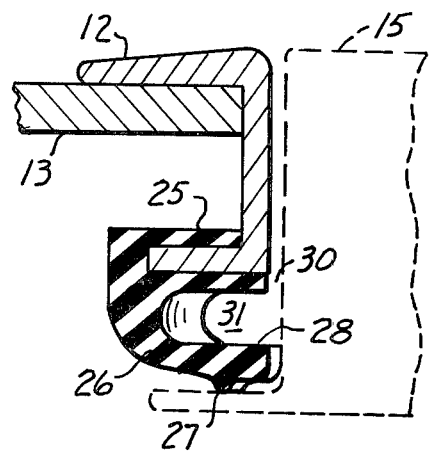
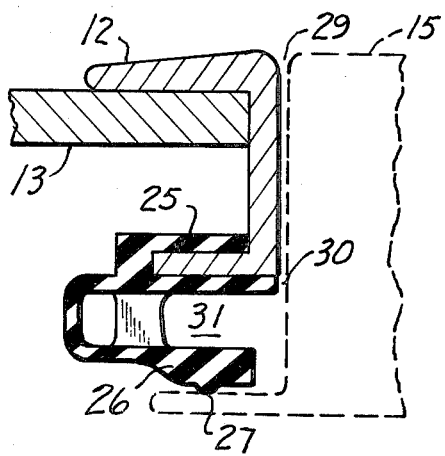
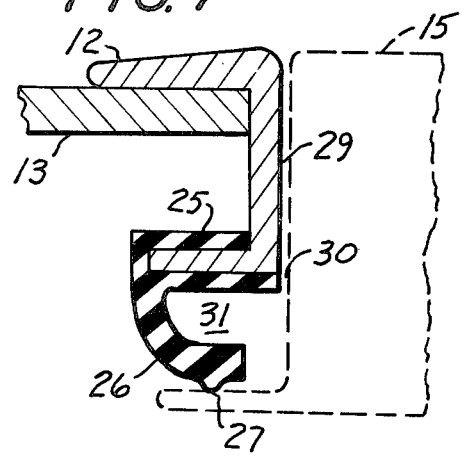
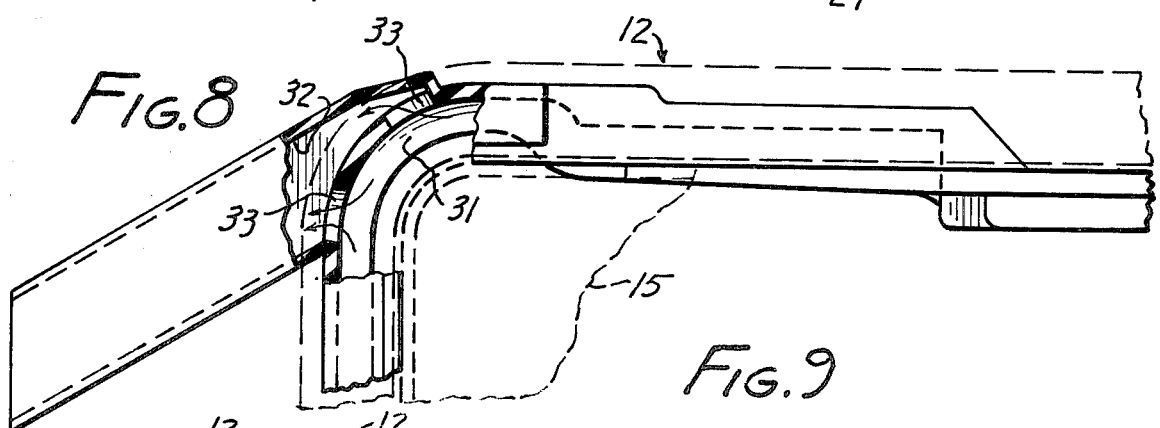
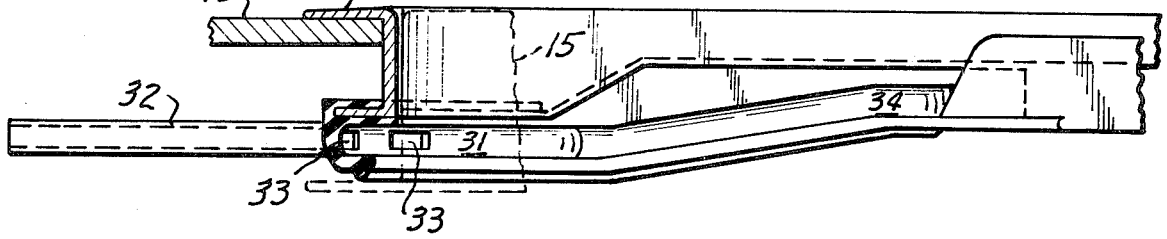

SELF DRAINING SEAL

This invention relates to a self draining seal, and especially to a self draining seal which will drain the gap between itself and a pivoted member such as a rumble seat lid and a surrounding structure such as a trunk lid in which the rumble seat lid is pivotally mounted.

It is known to provide rumble seats by cutting an aperture in a trunk lid and installing it therein. Two such structures are shown in applicant's U.S. Pat. No. 4,103,961 issued Aug. 1, 1978 and in their presently pending patent application Ser. No. 819,270 filed July 27, 1977, U.S. Pat. No. 4,139,232. In the latter disclosure, a pivoted member is shown mounted so as to have a tilted position where it can function as the back support for a rumble seat and a closed position where it closes the aperture. In the tilted position it extends through the aperture and projects from both sides thereof. In the closed position it is substantially aligned with the boundary of the aperture. There is always a gap between the member and the boundary of the aperture, and should water collect in this aperture and the tilted member be moved from its closed position, it is possible for that water to discharge into the rumble seat cavity. This is of course an undesirable situation especially in expensive installations such as Cadillacs and the like. Such installations can readily cost as much as two thousand dollars and their staining and soiling by such water would be intolerable.

Accordingly it is an object of this invention to provide a seal which seals between the pivoted member and the aperture boundary, which is self draining, and which drains from the gap the water which collects therein that might tend to discharge into the rumble seat when the tilted member is open.

An abutment type peripheral seal according to this invention is utilitzed in an installation where a pivoted member is movable between a tilted position wherein it passes through the aperture and projects beyond both sides of it and a closed position where it lies in general alignment with the boundary and substantially closes the aperture. In a direction which is usually forward in an automobile, the seal is made so that water is kept above part of the seal. In another portion of the seal, channel means is formed which is open to the gap to receive water therefrom and an exit conduit connects to the channel means to drain the channel means and discharging water outside of the rumble seat area.

According to a preferred but optional feature of the invention, the abutment contacts are made by springily-deflectible lips.

The above and other features of this invention will be fully understood from the following detailed description in which:

FIG. 1 is a plan view of one-half of the presently preferred embodiment of seal according to this invention, the other half being a mirror image thereof;

FIGS. 2 through 7 are cross-sections taken at lines 2—2 through 7—7, respectively, in FIG. 1;

FIG. 8 shows a portion of FIG. 1 in partially cutaway cross-section; and

FIG. 9 is a cross-section taken at line 9—9 in FIG. 1.

Figure 1:
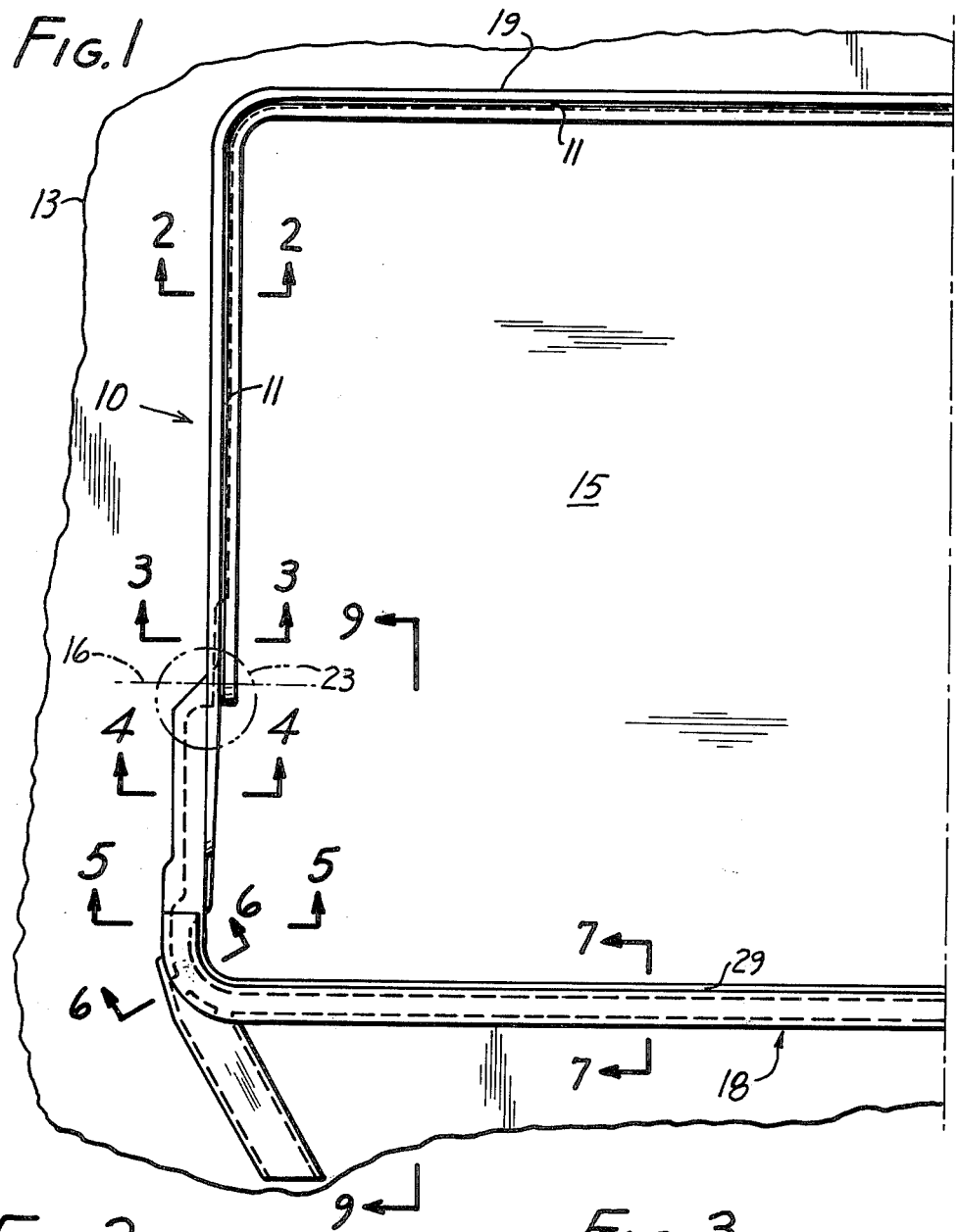

In FIG. 1, seal 10 is shown. This seal will preferably be made entirely of elastomeric material such as urethane so as to be inherently springily deflectible. The seal can be cast or molded by conventional manufacturing techniques.

It is intended to be installed in the boundary of an aperture 11 formed in a surrounding structure 12. FIGS. 2 through 7 and 9 show the surrounding structure as a molding member which is fitted into a trunk lid 13 in which a hole is cut. The molding is fitted to the edge of the hole. A pivoted member 15 is pivotally mounted in the aperture by means This pivoted member is as shown in either of the two above-referenced disclosures to be pivotable to a generally upright tilted position wherein it projects from both sides of the aperture, and pivoting around an axis or region 16 to the closed position illustrated in the FIGS. of this specification.

The pivoted member has an under face 17 along a first part of its periphery generally above axis 16 in FIG. 1 and an upper face along a second part 18 of its periphery generally below axis 16 in FIG. 1. The reason for this arrangement is that as the pivoted member pivots closed, its under face 17 bears down and the upper face bears up, both against the seal. For this reason, the seal must face up toward the under face and down toward the upper face.

Figure 2:
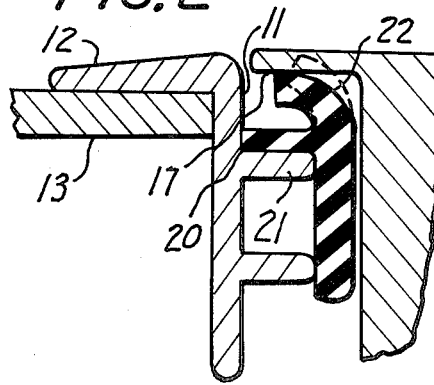
Figure 3:
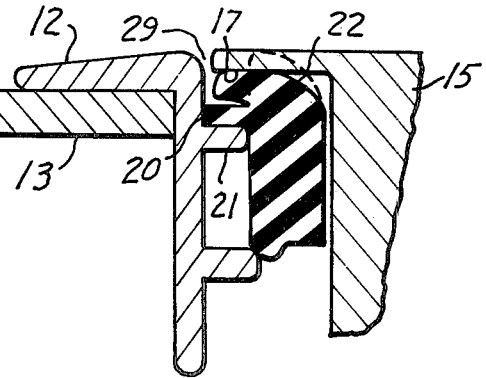

As best shown in FIGS. 2 and 3 over the said first part 19, the seal has a mounting flange 20 which can be mounted to a corresponding flange 21 on the molding. It can be cemented thereto so as to make a fluid-tight seal. The seal includes an upwardly facing portion 22 which faces toward and is able to make a fluid sealing contact with under face 17. It is inherently deflectible so as to make a fluid sealing contact with the under face. The deflected position is shown in solid line, and the undeflected position is shown in dashed line. The upwardly facing portion extends generally around the region above axis 16 in FIG. 1. Near axis 16 there is a transition region 23 to accommodate the change in direction of contact. Below that region as shown in FIGS. 4 and 5, the molding changes its shape. The seal is provided with appropriate attachment flanges 24, 25 for mounting it thereto. It has a downwardly facing portion 26 which includes a bead 27 to make contact with upper face 18 on the pivoted member. This bead is disposed on a lip 28 which is inherently deflectible so as to make a fluid seal.

The gap 29 between the surrounding structure and the pivoted member is shown. Also there is a clearance 30 between the seal and the pivoted member generally below region 16 in FIG. 1 so that water draining from the upper part of the seal in FIGS. 2 and 3 can drain downward into channel means 31 formed in the seal at the region of sections 4—4 and 5—5. This channel means in turn connects to an exit conduit 32 which opens into the channel means at exit ports 33. In turn this exit conduit, which can be a flexible hose leads to a region outside the rumble seat area. As best shown in FIG. 7 this region of the channel means is closed in the same way as it is in FIG. 5 and also connected to the exit ports and exit conduit.

As a consequence of the foregoing construction, when the pivoted member is in its closed position as shown in the figures water can drain into the gap generally forward of axis 16 and can flow into region 34 generally above the upwardly facing portion of the seal. This water will flow down, especially around a rumble seat which has a slope, past axis 16 down through the gap and down through clearance 30 and into the channel means where it will be conducted to the exit conduit through the exit ports.

Accordingly, the gap between the pivoted member and the surrounding structure will always be drained by the seal so that when the pivoted member is raised there will be no water left in this area to drain into the rumble seat. One good reason for providing an exit conduit on each side of the seal is because many times the vehicle will be parked on a crowned road so that it is best to provide for drainage at both sides.

This invention thereby provides a seal which is inherently self-draining. It has substantial advantages in rumble seat construction, but can also be used to seal between other closures and their apertures around which water would ordinarily tend to accumulate and later to become a nuisance.

This invention is not to be limited by the embodiment shown in the drawings and described in the description which is given by way of example and not of limitation, but only in accordance with the scope of the appended claims.

We claim:

1. An abutment-type peripheral seal for sealing and draining the gap between a pivoted member and the boundary of an aperture in a structure, said member being movable between a tilted position wherein it passes through the aperture and projects beyond both sides of the structure, and a closed position where it lies in general alignment with the boundary and substantially closes the aperture, said member having an under face along a first part of its periphery, and an upper face along a second part of its periphery, said faces being directed in the direction of movement toward the boundary when the member moves from its tilted to its closed position, said seal being attached to said boundary, and having an upwardly-facing portion and a downwardly facing portion, each so disposed and arranged as respectively to make a fluid-sealing contact with the upper face and under face, respectively, of the member, the abutment of the downwardly facing portion and the under face and the abutment of the upwardly facing portion and the upper face serving to retain above said abutments water which enters said gap, said seal in its downwardly facing portion including channel means open to said gap, and an exit conduit connected to said channel means, both for the purpose of draining said channel means.

2. A seal according to claim 1 in which both of said seal portions are springily deflectible.

3. A seal according to claim 1 in which said upwardly-facing portion includes a springily deflectible lip to contact said under face, and a channel-forming flange in said gap sealingly attached to said structure, whereby to form a water conducting channel which conducts water toward said downwardly-facing portion.

4. A seal according to claim 1 in which said downwardly-facing portion includes a springily deflectible lip to contact said upper face, said gap being open above said lip to receive water which enters the gap.

5. A seal according to claim 4 in which said upwardly-facing portion includes a springily deflectible lip to contact said under face, and a channel-forming flange in said gap sealingly attached to said structure, whereby to form a water-conducting channel which conducts water toward said downwardly-facing portion, said water channel discharging water to said channel means, whereby water from all portions of the seal are drained out the exit conduit.

6. A seal according to claim 5 which is substantially rectangular, said structure having a slope and said exit conduit being located at a corner of said rectangle.

7. A seal according to claim 6 in which an exit conduit is disposed at each of two lower corners of said seal.

8. In combination: an automobile trunk lid in which an aperture is formed, a pivoted member in said trunk lid; and the seal of claim 1 attached to the boundary of said aperture.

* * * * *